United States Patent Office 2,999,822
Patented Sept. 12, 1961

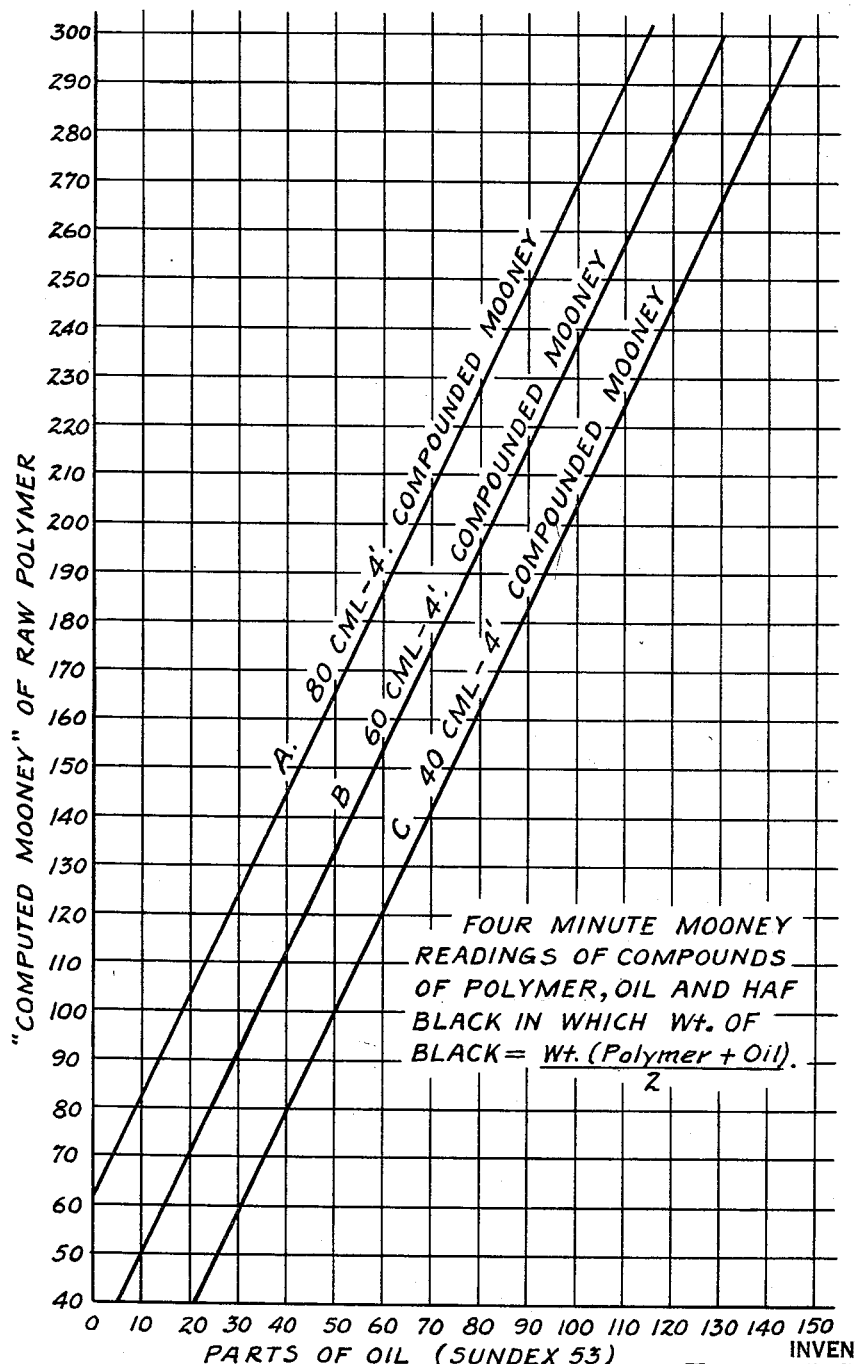

2,999,822
MIXTURE OF TWO COPOLYMERS OF A CONJUGATED DIOLEFINIC COMPOUND AND AN OILY PLASTICIZER AND ARTICLES FORMED THEREFROM
Emert S. Pfau, Cuyahoga Falls, and Gilbert H. Swart and Kermit V. Weinstock, Akron, Ohio, assignors to The General Tire and Rubber Company, Akron, Ohio, a corporation of Ohio
Filed June 7, 1952, Ser. No. 292,308
17 Claims. (Cl. 260—2.5)

This application is a continuation-in-part of our application Serial No. 196,584, filed November 20, 1950, now Patent No. 2,964,083, and relates to combinations of an oil and heterogeneous compound or mixtures of polymers of different characteristics, one of which is hard or tough at a given temperature, and another of which at the same temperature is relatively soft or plastic. It particularly relates to mixtures of oils and heterogeneous mixtures of polymers having different styrene and butadiene ratios and having the higher butadiene containing polymer of a cross-linked or tough character and the higher styrene copolymer of more plastic character at mixing temperatures.

The heterogeneous compounds prepared by mixing GR-S with the rubber having more than 50 percent styrene such as the polymers containing 70 to 95 percent of styrene and 30 to 5 percent of butadiene have found very important industrial uses, particularly in the manufacture of shoe soles, luggage, and the like. Stocks made up from such combinations have good processing and forming characteristics and have substantial hardness so that they may be utilized frequently even without the necessity for vulcanization, although vulcanization is usually utilized. One of the factors that has prevented even wider use of these materials has been the high cost of the compounds. The amounts of softener or plasticizer used in such compounds has been very small. In fact, the expensive higher styrene containing rubber is used to obtain a hardness which would seem to be neutralized by any softener or plasticizer addition.

It is an object of the present invention to provide lower cost compounds capable of being vulcanized and formed into flexible rubber articles such as sponge or solid shoe soles, floor tile, and the like having relatively high hardness combined with flexibility.

It is another object of the present invention to provide shoe sole type compounds capable of being molded into shoe soles of equivalent or superior quality to those heretofore produced, but at substantially less cost.

It is another object of the present invention to provide a method of making vulcanizable rubber compounds capable of forming articles of relatively high hardness such as may be used for shoe soles, luggage and the like at lower cost and with superior processability.

Other objects will be apparent from the following description of the invention.

In accordance with the present invention, we have found that under certain circumstances mixtures or compounds comprising (1) a rubber with a high diolefinic content and (2) a rubber with a high styrene (or equivalent mono-olefinic) content and low diolefinic content may be mixed with 30 and more parts (based on the weight of the higher diene containing rubber) of high boiling plasticizers such as hydrocarbon mineral oils and yet remain capable of being formed into products of equivalent quality to those obtained from non-oil containing mixtures heretofore used. In order to permit the dilution with the low cost oil with retention of properties, the higher diolefinic rubber must be in a sufficiently tough or cross-linked state to be characterized by a Mooney or computed Mooney viscosity of at least 90 (preferably 120 to 150 or more). Such compounds have properties at least equal to those obtained when both the oil or plasticizer and the said tough or cross-linked rubber in the above compounds is substituted by the same total weight to the ordinary 50 Mooney GR-S rubber. The amount of oil used is dependent on the toughness or computed Mooney viscosity of the low styrene (high diene) rubber. The higher the computed Mooney viscosity, the higher is the amount of oil or plasticizer which may be used as a diluent to decrease cost without appreciably deteriorating properties. As much as 100 or even 150 parts of oil may be used when the high diolefinic rubber is completely unmodified and of greatest toughness.

About 45 parts of oil or plasticizer is usually preferred when the high diene rubber has a computed Mooney (measured as hereinafter described) of 150. It is thus seen in view of the fact that the oil may be usually obtained for a small fraction of the cost of GR-S that the cost of the high quality compounds produced in accordance with the present invention is materially reduced over compounds prepared with GR-S in place of the high Mooney viscosity rubber above mentioned.

While high oil or high plasticizer compounds have been generally considered to be exceedingly poor when adhesion by cementing is required, we have found that good adhesion may be obtained by the use of suitable cements even with high oil containing rubber compounds of the present invention.

The rubber having the high content of diolefinic compound may be a homopolymer of butadiene, isoprene, dimethyl butadiene, chloroprene, or other diolefinic compound of up to 7 aliphatic carbon atoms or a copolymer of any of the aforementioned diolefinic compounds (including diolefins) having conjugated double bonds with hydrocarbon substituted or unsubstituted mono-olefine and/or mono-olefinic compound copolymerizable therewith, which rubber is further characterized by having 50 per cent or more of its mass made up of combined diolefinic compound having materially less mono-olefine or mono-olefinic compound in combined form than has the normally hardening rubber component of the compounds or mixtures.

The high mono-olefinic low-diene rubber which is the hardening component of the mixture or compounds of the present invention preferably comprises from 80 percent to about 95 or 96 percent of a mono-olefinic compound such as styrene and 20 to 4 percent butadiene. It is a cross-linked rubber which is more plastic at higher rubber mixing temperatures than the tough polymer although harder at normal temperatures. The unsaturation permits vulcanization which is an important property in forming most commercial products from the composition.

The hardening component is, as beforementioned, preferably a copolymer of styrene and butadiene containing 80 to 95 per cent of styrene and 20 to 5 percent of butadiene. However, the butadiene-1,3 may be substituted in whole or in part by other conjugated diolefinic compounds such as isoprene, 2,3-dimethyl butadiene-1,3, chloroprene, etc., having up to 7 aliphatic carbon atoms and conjugated double bonds. The styrene may be substituted in whole or in part by one or more of copolymerizable mono-olefinic compounds capable of homopolymerization to a hard polymer including methyl-methacrylate, methyl isopropenyl ketone, etc., although styrene is by far the most desirable in view of the fact that it is hydrocarbon and more compatible with other hydrocarbon rubbers.

Plasticizers used in accordance with the present invention are preferably substantially hydrocarbon and should have a boiling point of at least 350° and preferably above 400° F. or even above 450° F. The higher the boiling point, the less is the chance of loss of plasticizer; hence, a plasticizer boiling at infinity is even more desirable.

The plasticizer, as mentioned in our aforementioned prior application, should preferably be a liquid or oily material at room temperature although solid or semi-solid plasticizers may be used when they fuse or become liquids at the elevated mixing temperatures used which may be as high as 250–275° F. Liquid plasticizers with a low pour point are ordinarily much superior for making articles that are flexible at low temperatures. The plasticizers which are substantially hydrocarbons are usually obtained from petroleum manufacture. Those liquids which have a mineral oil base and have a low aniline point or high aromatic content are preferred when the rubber component that contains the high diene, styrene, or has appreciable amounts of aromatic monomer. While mineral oils are preferred as the oily plasticizer and give compounds of exceptional properties, other oily materials such as coal tar oils and the like may also be used for part or all of the plasticizer. When the compound is desired for arctic or low temperature use, the plasticizer or oil should have a low pour point, and some of the best plasticizers for such purpose are the cardinols, which are lower alkyl ethers of an alkylated phenol having about 15 carbon atoms in the aliphatic side chain of the phenol, and a lower alkyl group of not in excess of 5 or 6 carbon atoms attached to oxygen. In cardinol, the alkyl side chain attached to the benzene nucleus has the formula $$-CH_{15}H_{(27-31)}$$

The following are examples of plasticizers showing identifying data, trade names, manufacturers or suppliers, and relative loss upon exposing the oil for the time indicated to 300° F.

| Oil | Manufacturer | Pour Point, °F. | Flash Point, °F. | Aniline Point, °F. | Boiling Range, °F. | Heat Loss at 300° F. | |
|---|---|---|---|---|---|---|---|
| | | | | | | 1 hrs. | 3 hrs. |
| Sundex 53 | Sun Oil Co. (a dark aromatic and naphthenic blend lubricating oil extract consisting of 76% aromatic hydrocarbons and 26% naphthenic hydrocarbons. It has Saybolt viscosity at 210° F. of 90 seconds, a specific gravity of .97. Some of the hydrocarbons have aliphatic unsaturation). | 70 | 380 | 130 | | 3 | 6 |
| Dutrex 6 | Shell Development (A complex high mol. wt. aromatic and unsaturated hydrocarbon petroleum oil having no volatiles or asphaltic residue and having a specific gravity of 1.02 and a Saybolt viscosity at 212° F. of 142). | | | | +600 | 1 | 2 |
| Dutrex 7 | Shell Development (A hydrocarbon plasticizer of heavy process oil type derived from petroleum and having a specific gravity of 1.0 and a Saybolt Universal viscosity of 142 at 212° F.) | | 440 | | | 1 | 2 |
| Circosol 2X | Sun Oil Co. (A light green viscous hydrocarbon liquid having the specific gravity of .94, Saybolt viscosity at 100° F. of about 2000 seconds and at 210° F. of about 85 seconds. It is a naphthenic type hydrocarbon containing some aromatic oil. It is predominantly naphthenic). | 10 | 430 | 181 | +700 | 1 | 3 |
| Califlux GP | Golden Bear Oil Co. (Blend of unsaturated components of naphthenic base petroleum. It has a specific gravity of 1.01 and a Saybolt viscosity at 210° F. of 110 seconds.) | 45 | | [1] 34° C. | +665 | 4 | 12 |
| Sovaloid N | Socony Vacuum (Dark brown mineral oil containing about 80% of aromatic hydrocarbons and containing some naphthenic hydrocarbons. It has a specific gravity of 1.03, a Saybolt Universal viscosity of 44 at 210° F.) | Below 0 | 350 | [1] 115 | +600 | 14 | 31 |
| Sovaloid O | Socony Vacuum (Synthetically produced entirely aromatic hydrocarbon petroleum oil having a specific gravity of 1.06, a Saybolt Universal viscosity at 110° F. of 36). | 10 | 330 | [1] 66 | +580 | 2 | 3 |
| Cardolite 625 | Irvington Paint & Varnish Co. (Cardanol stated to be the monophenolic component of commercial cashew nut shell oil. Cardolite 625 is ethyl ether of Cardanol. Some unsaturation in side chain). | | | | | 6 | 14 |

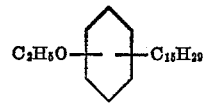

| QXS158B | Imperial Oil Co. (Naphthenic light distillate) | | 325 | 162 | | 14 | 29 |
| QXS158D | Imperial Oil Co. (Refined naphthenic light distillate) | | 345 | 172 | | 1 | 2 |
| QXS158E | Imperial Oil Co. (Refined naphthenic heavy distillate) | | 470 | 207 | | 9 | 28 |
| QXS158F | Imperial Oil Co. (Highly refined naphthenic light distillate) | | 345 | 207 | | 1 | 1 |
| QXS158G | Imperial Oil Co. (Highly refined naphthenic heavy distillate). | | 490 | 270 | | 7 | 17 |
| QXS158H | Imperial Oil Co. (Asphaltic plasticizer (processed cracked tar)). | | 315 | | | 16 | 33 |
| Liquid Poly B.D. | Phillips Petroleum Co. (Low molecular weight polybutadiene). | | | | | 7 | 10 |
| ASTM#1 | (ASTM Standard Oil) | | 470 | 124° C. | | 1 | 2 |
| ASTM#2 | (ASTM Standard Oil) | | 475 | 93° C. | | 1 | 3 |
| ASTM#3 | (ASTM Standard Oil) | | 350 | 70° C. | | 15 | 26 |
| TP90B | Thiokol Corporation (High molecular weight liquid oily polyether). | | | | | 4 | 34 |
| Harflex 500 | Binney & Smith (Phenyl oleate) | | | | | 4 | 9 |
| Flexol 8N8 | Carbon & Carbide Co. ($C_7H_{15}COO-C_2H_4)_2NCOC_7H_{15}$) | | | | | 4 | 10 |
| Circle Light Oil | Sun Oil Co. (More volatile than Circosol 2XH and more aromatic hydrocarbons. It is a petroleum distillate obtained after the cracking process). | Below 0 | 325 | 157 | | 12 | 30 |
| Neville Heavy Oil | Neville Company (Aromatic hydrocarbons largely derived from thermal decomposition of coal or oil). | | | [1] 28.2 | | | |
| Diamond Process Oil | Standard Oil Company (Low pour point oil largely paraffinic. It is a petroleum distillate obtained after the cracking process has a specific gravity of .883, a flash point of 360, a viscosity at 100° F. of 100, and at 210° F. of 39, an aniline point of 1.79, and a pour point of 15 to 20° F.) | | | | | | |
| Resinex 14 | Hawick Standard Chemicals (Polymerized aromatic resins from cracked petroleum oils. Coumarone-indene) | | | | | | |
| Cardolite 7625 | Irvington Paint & Varnish Company (Ethyl ether of vacuum distilled Cardanol. It has two aliphatic double bonds per mol (625 has 0.8 double bond per mol)) | | | | | 3 | 11 |
| Cardolite 6583 | Irvington Paint & Varnish Company (Benzyl ether of Cardanol. Same as Cardanol 625 except the benzyl group is substituted for the ethyl group). | | | | | 5 | 9 |

[1] Mixed Aniline point.

The proportions of the high styrene or high monoolefinic content rubber or hardening component and the low styrene-high diolefinic rubber may be varied as desired according to the properties desired in the final compound. Generally at least 15 or 20 parts by weight of the high styrene rubber is desired in shoe soles per 100 parts by weight of the high diene rubber plus oil present, although as low as 5 parts is sometimes used to obtain benefit in processability when substantial amounts of other pigment such as integrally precipitated lignin etc. is used. For most applications, the amount of high styrene component is usually less than the quantity of the tough low styrene, high diene rubber plus oil or plasticizer present, although for certain applications as much as 70 or 80 percent of the total polymeric materials in the compound may be made up of the high styrene or mono-olefinic containing component. A selection of the quantities of the two components may be readily made by those skilled in the art.

If the main benefits of lower cost quality compounds are to be obtained, the oil or plasticizer as aforementioned should ordinarily be 30 parts or more based on the amount of tough, high diolefinic containing rubber present in the compound. Such compounds are found to have at least as good properties as GR–S compounds with no oil present, which GR–S compounds have the total quantity of oil plus high diene rubber substituted by the same weight of 45–50 Mooney GR–S. In view of the inherently easy processing characteristics of mixtures of the two polymers, processing may, however, be obtained with substantially less plasticizer although at higher costs. As low as 20 parts of plasticizer permits one to obtain substantial economic advantages, particularly when the preferred substantially hydrocarbon plasticizers are utilized.

The compounds of the present invention are preferably mixed in a latex state as described in U.S. Patent No. 2,457,097, which describes the preparation of easy processing rubber compounds. The oil or plasticizer is also preferably added as an emulsion or dispersion to the latex mixture. Compounds prepared by mixing a latex of the tough high butadiene or high diene containing polymer with the high styrene containing rubber need not be masticated at the highly elevated temperatures required when the two polymers are admixed together by a Banbury or mill. The reinforcing of the high diene rubber by the low diene rubber is obtained without a fluxing operation, indicating the formation of a compound upon mixing and drying operation.

The compounds of the present invention may also be prepared by mastication procedures wherein the hard and the soft polymers, instead of the aqueous dispersions of latex, are mixed in suitable masticating apparatus such as a Banbury, mill rolls, Warner-Fleider mixer, etc. In preparing mixtures, the tough rubber is preferably first placed in the mixer, for example a Banbury, and combined with the oil and the relatively non-cross-linked high styrene rubber is placed therein. In order to prepare a substantially reinforced product, however, in accordance with this mixing procedure, a high temperature such as 250° F. or 275° F. should be maintained during at least part of the mixing cycle. When the compounds are mixed in the latex state, the high temperature is unnecessary in order to obtain the equivalent hardness. The deterioration of the compound is therefore considerably less in the case of the latex mixes.

We have found that most synthetic rubbers that are prepared in emulsion and at temperatures substantially below 60° F. produce articles which have superior properties. These so-called "cold rubbers," particularly when they are made below 50° F. in the presence of some very minor amounts of a modifier, are generally substantially gel free or have longer chains in proportion to the number of cross links than have the higher temperature polymers.

The following examples (in which parts are by weight, and parts of the latices are based on rubber solids content) illustrate the invention:

*Example 1*

| | Parts |
|---|---|
| Butadiene-1,3 | 15 |
| Styrene | 85 |
| Water | 180 |
| Soap | 4–5 |
| Dodecyl mercaptan | .05–.3 |
| Potassium persulfate | .3 |

The above ingredients were incorporated into an autoclave, whipped with stirring apparatus and agitated at 50° C. until polymerization was substantially complete. Samples of the latex obtained when coagulated produced a relatively hard rubber which softens readily to a rubbery but more easily deformable state so that it is highly plastic at rubber mixing temperatures of the order of 250° F.

*Example 2*

| | Parts |
|---|---|
| Butadiene | 72 |
| Styrene | 28 |
| Water | 180 |
| Soap | 4–5 |
| Cumene hydroperoxide | .12 |
| Potassium pyrophosphate | .23 |
| Ferrous sulfate | .25 |
| Potassium sulfate | .08 |
| Daxad 11 (a condensation product of naphthylene sulfonic acid and formaldehyde) | .1 |

The ferrous sulfate is dissolved in a small amount of water having a pH of 3. The pyrophosphate is also dissolved in a small amount of water and added to the ferrous sulfate solution. The thus mixed aqueous solution is heated by addition thereto of live steam until the temperature of 140° is reached, whereupon it is rapidly cooled to provide the activator for the above polymerization. The butadiene and styrene and the cumene hydroperoxide are added to a solution of the soap in the remainder of the water. The activator as above prepared is then incorporated into the autoclave containing the other ingredients.

The above mixture is then agitated in an autoclave, maintained at 41° F. by adequate cooling jacket with constant stirring until a conversion of about 72 percent is obtained. The latex is stripped from unpolymerized monomer by steam distillation and examples of the resultant latex when coagulated and dried showed that the rubber produced had a computed Mooney viscosity of about 210. While this high butadiene is not as hard as that produced in Example 1 at rubber mixing temperatures, it is much less plastic and considerably tougher at elevated temperatures of 250° F. indicating it to have a much greater degree of cross-linking than the products produced according to Example 1. This is also the case even though the mercaptan be omitted from Example 1, perhaps because of the lesser percentage of butadiene present for cross-linking in the higher styrene rubber. Both of the rubbers of Examples 1 and 2 are, however, sulfur vulcanizable because of the unsaturation present.

*Example 3*

50 parts of the latex produced in Example 1 are mixed with 50 parts of the latex produced in Example 2, together with 40 parts of an emulsion of Sundex 53. The mixture is coagulated with salt and acid in accordance with the usual coagulating procedure generally used throughout the synthetic rubber industry in the United States to produce a crumb which is dried in the same way as GR–S. The resultant compound is substantially equivalent in properties to a product produced by mixing 50 parts of a latex of Example 1 with 90 parts of the regular 50 Mooney GR–S rubber latex without any oil present, and coagulating and drying the coagulum. The cost of the first compound is very much less per pound than the latter.

Example 4

20 parts (solids content) of the latex of Example 1 are mixed with 90 parts of GR-S latex containing 72 percent butadiene and 28 percent styrene, which, when coagulated, produce a rubber having a viscosity of 50 Mooney. The mixture is coagulated in accordance with the usual procedure and dried. The product may be mixed with the usual vulcanizing agents, accelerators, pigments, etc., in accordance with usual compounding practice.

Example 5

20 parts of the latex of Example 1 is mixed with 50 parts of the latex of Example 2 and 40 parts (oil content) of an aqueous emulsion of Sundex 53. The mixture is coagulated and dried in the usual manner and found to produce products at least equivalent to those produced from the coagulum of Example 4, although the cost per pound of the compound of Example 5 is very materially less than that produced in Example 4.

The amount of mercaptan that may be present with the ingredients of Example 2 without preventing too high a plasticity (a Mooney reading less than 90), is dependent upon the degree of polymerization. The higher the degree of polymerization, the more mercaptan may be present. In the recipe of Example 2, as much as .12 percent mercaptan may usually be present without obtaining a Mooney viscosity of less than 100 in the final product. By the use of .12 percent of mercaptan (based on the weight of monomers) maintaining the degree of conversion at 72 percent, we often maintain a tough rubber having a computed Mooney viscosity of about 150. The amount of oil that may be added to provide a compound that is equivalent to that produced by GR-S is, as shown from the drawing, FIG. 1, in the vicinity of 50 parts per 100 parts of the tough diene rubber.

Example 6

Latex of Example 1 is spray-dried to produce a powdered polymer. 50 parts of the powder thus obtained are mixed with a like amount of coagulum obtained by coagulating and drying latex of Example 2 with the addition of 40 parts of oil. The coagulum of Example 2 is first incorporated in the Banbury mixer and the oil added a little at a time during the initial 2 minutes of mixing. The powdered polymer above obtained is incorporated by thorough mixing. The Banbury temperature is permitted to reach 285° F. to cause the high styrene rubber to be thoroughly dispersed within the tougher material at the mixing temperature. The mixture removed after 10 minutes is sheeted out and used for the production of articles which have substantially the same characteristics of those obtained from Example 3 without requiring the high fluxing mixing temperature.

When in the preceding example, the temperature of the Banbury is not permitted to go over 220° F. the properties of the resultant mix are exceptionally poor. Articles molded therefrom have a tensile strength but a small fraction of that produced when the mixture has been subjected during mixing to a sufficiently high temperature to provide fluxing or combination of the two materials.

The products of Examples 1 to 6 may be used in the manufacture of various articles including shoe soles and heels, luggage, floor tile, and other rubber articles.

Example 7

The rubber compound formed in accordance with Example 5 is mixed with 2 parts of sulfur, 5 parts of zinc oxide, 20 parts of a finely divided silica pigment obtainable under the trade name Hysil, 3 parts of the blowing agent, naphthylene 1,5 disulphonyl hydrazide, and one part of tetramethylthiuram disulfide. The ingredients, except for the sulfur and blowing agent, are mixed in Banbury mixer, sheeted out, and cooled. The blowing agent and sulfur is then added on rubber mill. The compound thus formed is cured in slab or sheet ¼" thick in a mold at 320° C. for 15 minutes without allowing expansion to occur. Upon release of pressure, the slab expands to about 300 percent of its original volume to form a closed cell sponge. Shoe soles in conventional form are clicked or cut from the slab and have properties of abrasion resistance at least equal to or superior to those formed from GR-S compounds containing the same amount of the high styrene rubber without any oily softener. In such GR-S compounds the tough high diene rubber and oil is substituted by an equal weight of regular 50 Mooney GR-S.

The naphthylene disulphonyl hydrazide of the above example is described in application of A. J. Beber et al., Serial No. 409,266, filed February 9, 1954, now abandoned. It is prepared by reacting one mol of naphthylene 1,5 disulphonyl chloride with two mols of hydrazidine hydrate in the presence of hydrochloric acid acceptor in sufficient amount to combine with the hydrochloric acid and insure complete reaction with the sulphonyl chloride with the hydrazidine hydrate and then separating out the desired reaction product. This blowing agent may be substituted by benzene sulphonyl hydrazide, para para', diphenol oxide bis sulphonyl hydrazide or other nitrogen liberating blowing agents.

The proportions of high styrene rubber to low styrene rubber in the above example may be varied as desired, the ingredients may be mixed by mastication instead of utilizing latex, etc. The sponge after removal from the mold may be heat treated to eliminate stress by maintaining it at curing temperature for a few minutes in the expanded condition. This contributes to dimensional stability.

Proper characterization of a given polymeric material may not always be made directly by means of a Mooney plastometer reading on the raw polymer, as gel content, gel distribution, and molecular weight affect the polymer and are not indicated by a Mooney plastometer. When a polymer is exceptionally tough so that it would have a Mooney reading about 120, slippage between the rotor and polymer frequently occurs with the result that the Mooney reading may be in error and not reliable. Furthermore, when the tough particles are distributed within softer particles of a rubbery polymer or when a non-homogeneous or a gel containing polymer is had, the Mooney plasticity reading frequently fails to characterize the polymer. Thus, while a Mooney plastometer is satisfactory in distinguishing between rubbers having no gel but of varying molecular weights until the Mooney reading is about 120 (where slippage or tearing may occur), it fails to distinguish between such rubbers and rubbers having substantial gel content. Gel containing rubbers require substantially increased amounts of plasticizer.

Reference should be had to the accompanying drawing which shows a graph in which the Mooney plasticities of various raw polymers of a given type are plotted against the amount of oil in compositions in which the said polymers have been compounded with oil and carbon black to provide plasticities of 40, 60 and 80 measured as indicated on a Mooney plastometer, the amount of carbon black in each instance being equal to one-half the combined weight of the polymer and oil.

We have found that in any given polymer modified so as to have substantially no gel, the amount of oil required to obtain a given compounded plasticity varies directly with the Mooney plasticity and directly with the intrinsic viscosity. Thus, there is a substantially straight line relationship between the amount of a given oily plasticizer required to obtain a given compounded Mooney and the raw Mooney reading when plotted as illustrated in the drawing, providing a given carbon black such as a fine reinforcing furnace black for example "Philblack O" (structural type of fine high abrasion furnace black of the Phillips Petroleum Company) is utilized and the amount of the carbon black is equal to a given percentage of the total weight of rubber plus oily plasticizer say 50 percent of the total of these two materials. We have also found that the compounded Mooney of a given polymer varies in approximately a straight line relationship with the amount of a given oily plasticizer contained therein. If therefore the polymers are of a non-gel type, and vary only by molecular weight as indicated by intrinsic viscosity measurements, then the curves obtained by plotting parts of oil necessary to obtain a given compounded Mooney (CML-4') versus measured raw Mooney of the polymer are approximately parallel lines especially when the accuracy of duplication and measurement is considered. We have made use of this fact as hereinafter further explained to develop the term "computed Mooney" which applies to all synthetic rubbery polymeric materials, regardless of how they are obtained. The "computed Mooney" of a gel containing polymer is the true Mooney of an equivalent gel free polymer. In FIGURE 1 calculated or "computed Mooney" is plotted versus parts of oil (Sundex 53) required in the various gel free polymers to obtain compounded Mooney values of approximately 40, 60 and 80 as shown by lines A, B, and C respectively with a short mixing cycle of not more than 12 minutes as hereinafter described. The computed Mooney and the measured raw Mooney are the same within accuracy of measurement at the lower values, i.e., below 120 for these gel free polymers.

It is preferred that the compounded Mooney of the rubber compound be within the range of 50 to 70. Line B, the curve for compounded Mooney values of 60 is therefore squarely in the center of the range preferred for factory processing. The slope of this line was obtained by plotting the measured raw Mooney reading of gel free polymers against the amount of oil required to obtain a compound with a 60 CML-4' (compounded Mooney of 60 measured with the large rotor at four minutes). Slopes and positions for 40 CML-4' and 80 CML-4' lines were obtained in the same manner except that the compounds were made to 40 and 80 compounded Mooney respectively. One may find "computed Mooney" of a given polymer utilizing the graph of the drawing by preparing a rubber carbon black mixture with a given amount of oil utilizing the mixing procedure described below and measuring the Mooney of the compound in the ordinary manner using the large rotor of a standard Mooney plastometer and reading the value at four minutes.

If the measured four minute compounded Mooney (CML-4') of the compound falls in the neighborhood between 40 to 80, i.e., near any of lines A, B, and C, the "computed Mooney" may be simply read from the scale designated "computed Mooney" using standard interpolation or extrapolation procedures. If the measured compounded Mooney is substantially removed from the range of 40 to 80 another compound with greater or less oil may be prepared showing a compounded Mooney closer to this range and the amount of oil and actual Mooney level may thereupon be read by interpolation procedures.

The mixing procedure used for evaluating a polymer may, of course, affect the plasticity of the compounds obtained with a given amount of oil or softener. Longer mixing times, particularly in the presence of insufficient softener will considerably deteriorate the polymer and result in lower Mooney. Even in the presence of substantial amounts of softener the substantially increased mixing times have slightly adverse effects effects on the polymer. If, therefore, in preparing a factory batch insufficient oil has been added to provide the processability necessary for the factory operations, increased processability may be had by remixing the material without any additional oil.

In preparing rubber compounds for evaluation the tough rubber is incorporated in a warm laboratory Banbury mixer (approximately 200° F.) worked for about one minute whereupon the tough rubber tends to break into fine crumbs which will not work into a cohesive mass in the Banbury. The oil is added in one or two increments depending on the amount of softener used and worked for four to six minutes. The oil should preferably be absorbed in the rubber before any carbon black is added, but the black can be added before the oil is completely absorbed if desired. When the Mooney polymer fails to break-up into a fine crumb in the Banbury a small amount of the black may be added initially to insure the formation of a fine crumb. The carbon black is added in several increments and worked four or five minutes until a fairly cohesive mass is obtained. Cold water is preferably circulated through the Banbury during the carbon black addition in order to prevent excessive temperature rise. The total mixing time should be only that required to obtain a cohesive mass. The mix should immediately be placed in a cold tight laboratory mill (6" x 12" rolls) and milled for two minutes at .050 separation of rolls allowed to cool one-half hour and the compounded Mooney determined. When the rubber compound is to be used for the production of rubber articles, the usual compounding ingredients may be added on a second pass through the Banbury mixer requiring about two to four minutes for the addition of the materials.

As above explained, sample compositions made for the purpose of computing the Mooney viscosity of a polymer have a carbon black content equal to one-half the combined polymer and oil content. As shown in the graph, a sample having 30 parts of oil to 100 parts of polymer and a measured Mooney plasticity of 60, would have a high abrasion furnace carbon black content of 65 and the computed Mooney plasticity of the polymer would be approximately 90. It will be apparent that the toughness of the polymer of any sample having 30 parts of oil and 65 parts of high abrasion furnace carbon black per 100 parts polymer and a measured Mooney plasticity of 60 or greater will be such that its computed Mooney plasticity will be at least 90. Conversely, a sample with 30 parts of oil and 65 parts of carbon black to 100 parts of a polymer of 90 or greater computed Mooney plasticity will have a measured Mooney plasticity of least 60. A similar relationship holds true for samples of various oil contents. For example, a sample composed of 100 parts of a polymer, 40 parts of oil and 70 parts of carbon black that has a measured Mooney plasticity of 60, has a computed Mooney plasticity of approximately 110.

We have found that for any given "computed Mooney" reading or for any given actual measured Mooney in a given type of polymer there is a minimum amount of oil which is required for satisfactory processing without long and uneconomical mastication cycles and mixes.

In the claims the term "computed Mooney" means the plasticity of a rubber computed as indicated by the graph shown in the drawing from the measured Mooney plasticity and the oil content of a sample composition composed of the rubber, carbon black and oil and compounded in accordance with the instructions above given.

What we claim is:

1. A mixture of (1) 5-80 parts of a copolymer of a conjugated diolefinic compound of less than 8 carbon atoms with a mono-olefinic compound copolymerizable therewith and comprising at least 80 parts by weight of said mono-olefinic compound, (2) 95-20 parts of a polymer of a conjugated diolefinic compound of less than 8 carbon atoms with a mono-olefinic compound copolymerizable therewith, having at least 50 percent by weight of diolefinic compound residue therein and being of a toughness such that a composition composed of 100 parts by weight thereof, 30 parts by weight of hydrocarbon oil and 65 parts of high abrasion furnace carbon black will have a Mooney plasticity of at least 60, and (3) an oily plasticizer in the amount of at least 30 percent by weight of said polymer.

2. A product of claim 1 wherein the mono-olefinic compound is styrene.

3. The product of claim 2 wherein said mono-olefinic compound is styrene and wherein said plasticizer is a hydrocarbon mineral oil having a boiling point of at least 450° F.

4. A compound according to claim 1 further characterized in that said mono-olefinic compound is styrene, said polymer being of a toughness such that a composition composed of 100 parts by weight thereof, 50 parts of hydrocarbon oil and 75 parts of high abrasion furnace carbon black will have a Mooney plasticity of at least 60 and the amount of oil is at least 35 parts based on the weight of said rubbery copolymer of said diolefinic compound.

5. The product according to claim 1 wherein the copolymer having at least 50 percent of diolefinic compound is one polymerized at a temperature below 50° F.

6. A closed cell sponge comprising a vulcanized mixture of (1) 15–50 parts of a polymer of a conjugated diolefinic compound of less than 8 carbon atoms, which polymer has more than 50 percent by weight of the atoms of said diolefinic compound in combined form and is of a toughness such that a composition composed of 100 parts by weight thereof, 30 parts by weight of hydrocarbon oil and 65 parts of high abrasion furnace carbon black will have a Mooney plasticity of at least 60 with (2) 50–15 parts of a copolymer of a conjugated diolefinic compound of less than 8 carbon atoms and of a styrene copolymerizable therewith, said copolymer having at least 80 parts by weight of atoms of at least one styrene, and (3) a liquid plasticizer compatible with said polymer and present in the amount of at least 30 percent by weight of said polymer the "computed Mooney" being the plasticity of said polymer computed as indicated by the graph shown in the drawing from the measured Mooney plasticity and the oil content of a sample composition composed of said polymer, carbon black and oil and compounded in accordance with the instructions given in the accompanying specification.

7. A shoe sole comprising a composition according to claim 6 in which said plasticizer is a petroleum base oil.

8. A mixture of (1) 15–80 parts of a copolymer of a conjugated diolefinic compound of less than 8 carbon atoms with a mono-olefinic compound copolymerizable therewith and comprising at least 80 parts by weight of said mono-olefinic compound, (2) 80–15 parts of a polymer of a conjugated diolefinic compound of less than 8 carbon atoms with a mono-olefinic compound copolymerizable therewith, having at least 50 percent by weight of a diolefinic compound residue therein and a Mooney plasticity of at least 90, and (3) an oily plasticizer in the amount of at least 30 percent by weight of said polymer of diolefinic compound having at least 50 percent of conjugated diolefinic compound therein.

9. A product of claim 8 wherein the mono-olefinic compound is styrene.

10. A product of claim 9 wherein said mono-olefinic compound is styrene and wherein said plasticizer is a hydrocarbon mineral oil having a boiling point of at least 450° F.

11. A compound according to claim 8 further characterized in that said mono-olefinic compound is styrene, said polymer has a Mooney plasticity of at least 135 and the amount of oil is at least 35 parts based on the weight of said rubbery copolymer of said diolefinic compound.

12. A closed cell sponge comprising a vulcanized mixture of (1) 15–50 parts of a polymer of a conjugated diolefinic compound of less than 8 carbon atoms, which polymer has more than 50 percent by weight of the atoms of said diolefinic compound in combined form and has a Mooney plasticity of at least 90 with (2) 50–15 parts of a copolymer of a conjugated diolefinic compound of less than 8 carbon atoms and of a styrene copolymerizable therewith, said copolymer having at least 80 parts by weight of atoms of at least one styrene, and (3) a liquid plasticizer compatible with said polymer and present in the amount of at least 30 percent by weight of said polymer.

13. A shoe sole comprising a composition according to claim 12 in which said plasticizer is a petroleum base oil.

14. A mixture of (1) 15–50 parts of a copolymer of a conjugated diolefinic compound of less than 8 carbon atoms with a mono-olefinic compound copolymerizable therewith and comprising at least 80 parts by weight of said mono-olefinic compound, (2) 50–15 parts of a polymer of a conjugated diolefinic compound of less than 8 carbon atoms with a mono-olefinic compound copolymerizable therewith, having at least 50 percent by weight of diolefinic compound residue therein, said polymer having a toughness such that a composition composed of 100 parts thereof with 30 parts of oil and 65 parts of carbon black will have a Mooney plasticity of at least 60, and (3) an oily plasticizer in the amount of at least 30 percent by weight of said polymer.

15. A product of claim 14 wherein the mono-olefinic compound is styrene.

16. The product of claim 15 wherein said mono-olefinic compound is styrene and wherein said plasticizer is a hydrocarbon mineral oil having a boiling point of at least 450° F.

17. A compound according to claim 14 further characterized in that said mono-olefinic compound is styrene, said polymer has a Mooney plasticity of at least 135 and the amount of oil is at least 35 parts based on the weight of said rubbery copolymer of said diolefinic compound.

References Cited in the file of this patent

UNITED STATES PATENTS

| | | |
|---|---|---|
| 2,217,918 | Rostler | Oct. 15, 1940 |
| 2,576,968 | Pike et al. | Dec. 4, 1951 |

FOREIGN PATENTS

| | | |
|---|---|---|
| 260,868 | Switzerland | Aug. 1, 1949 |

OTHER REFERENCES

Grote and Rostler: Rubber Age, September 1945, pages 685–690.

Shearon et al.: Ind. and Eng. Chem., volume 40, No. 5, pages 769–777, May 1948.

Grote et al.: Article in Rubber Age, volume 57, No. 6, September 1945, pages 685–687 and 689 and 670.